United States Patent [19]
Hynes et al.

[11] 3,746,372
[45] July 17, 1973

[54] FLEXIBLE PIPE JOINTS

[75] Inventors: Joseph H. Hynes, Ojai; Walter J. Hintzen, Santa Barbara; Martin B. Jansen, Ventura, all of Calif.

[73] Assignee: Vetco Offshore Industries, Inc., Ventura, Calif.

[22] Filed: May 27, 1971

[21] Appl. No.: 147,502

[52] U.S. Cl............... 285/95, 285/94, 285/261, 285/263, 285/DIG. 1
[51] Int. Cl............................................ F16l 17/00
[58] Field of Search................. 285/94, 93, 106, 285/95, 96, 261, 263, DIG. 1, 302

[56] References Cited
UNITED STATES PATENTS

| | | | |
|---|---|---|---|
| 3,479,061 | 11/1969 | Smookler et al. | 285/263 X |
| 3,056,615 | 10/1962 | Breitenstein | 285/263 X |
| 3,199,900 | 8/1965 | Baer | 285/302 |
| 3,319,981 | 5/1967 | Burgess | 285/302 |
| 3,378,281 | 4/1968 | Smith | 285/261 X |
| 3,433,504 | 3/1969 | Hones | 285/93 |

FOREIGN PATENTS OR APPLICATIONS

455,037  2/1950  Italy................................ 285/302

*Primary Examiner*—Dave W. Arola
*Attorney*—Bernard Kriegel

[57] ABSTRACT

A pressure balanced ball and socket type joint particularly adapted for connecting pipe sections in the mariner riser conductor and choke/kill lines of an undersea drilling rig. Two closed hydraulic systems incorporated in the joint transfer the pressure of the sea water outside the joint and the drilling mud within the joint to selected areas between the ball and socket members to substantially balance the forces which the sea water and drilling mud impose on the joint.

7 Claims, 5 Drawing Figures

INVENTOR.
JOSEPH H. HYNES
WALTER J. HINTZEN
MARTIN B. JANSEN
BY
Bernard Kriegel
ATTORNEY.

Fig. 4.

INVENTORS.
JOSEPH H. HYNES
WALTER J. HINTZEN
MARTIN B. JANSEN
BY
Bernard Kriegel
ATTORNEY.

FLEXIBLE PIPE JOINTS

The present invention relates to flexible pipe joints particularly adapted for use in a string of underwater pipe (such as a marine riser conductor extending between a subsea well bore and a floating vessel from which the well is being bored), or a choke/kill pipe line extending between the vessel and a blowout preventer stack located just above the sea floor.

In drilling subsea oil and gas wells from a floating drilling vessel, the vessel is subject to movement off its location above the well bore by wind, current or wave action. This motion of the vessel causes bending or deflection in the marine riser conductor, which constitutes a part of the connection between the well head and the floating vessel, and in the pipe lines (commonly referred to as choke/kill lines) running between the vessel and the blowout preventer stack. It has been the practice in drilling under these conditions to use flexible joints in the marine riser conductor and the choke/kill lines to prevent damage to these pipes.

One type of flexible joint which has been used in the riser pipes and choke/kill lines is a ball and socket joint of the type shown (for example) in U. S. Pat. No. 3,433,504. While this type of ball and socket joint has proven operable in many installations, it is subject to disadvantages when used at increased water depths. Friction between the mating surfaces of the ball and socket members may restrict their relative movement and cause wear, and, eventually, leakage therebetween. Since the friction between the bearing surfaces of the ball and socket members is created by forces imposed by the hydrostatic pressure heads of the sea water outside the pipe and the drilling mud (or other fluid) in the pipe, the friction caused problems become more acute with increases in the depth at which the ball and socket joints are disposed. In very deep water these forces (and the resultant friction created thereby) might well render use of such ball joints unfeasible.

Accordingly, it is an object of the present invention to provide an improved flexible connector especially adapted for use in subsea well drilling equipment and which overcomes the foregoing problems associated with prior flexible connectors.

A further object of the present invention is to provide a pressure balanced joint between two pipe sections which minimizes friction creating forces caused by the pressure head of the fluid within the pipe and/or the fluid surrounding the pipe.

Another object of the present invention is the provision of a flexible joint between two relatively movable pipe sections which incorporates means for providing a constant reservoir of lubricant for supply to the bearing surfaces of the components of the joint.

Figures 1, 2:
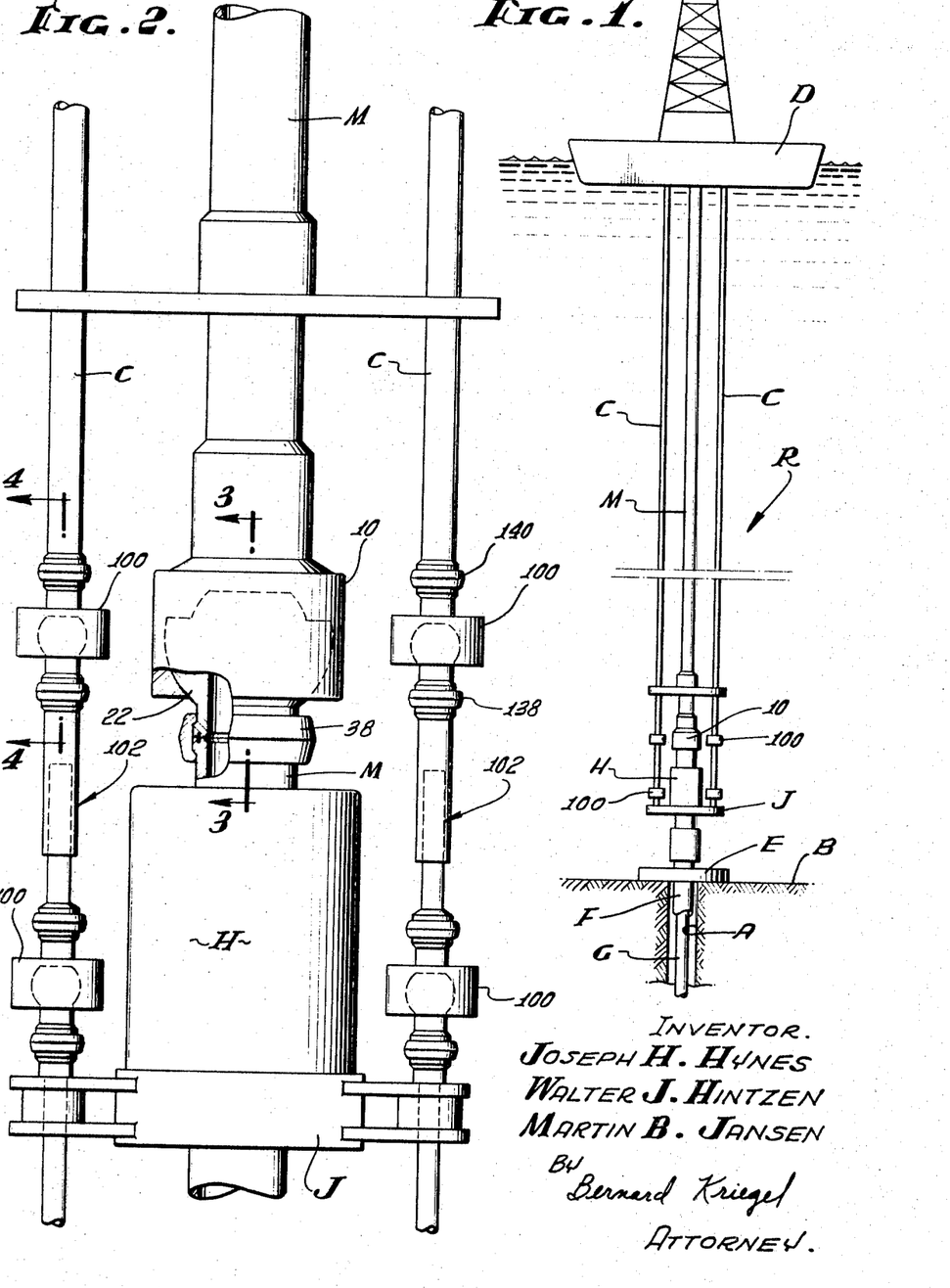
FIG. 1 is a diagrammatic view showing a well bore being drilled in a sea floor from a floating vessel, with pressure balanced ball and socket type joints, constructed according to the teachings of the present invention, incorporated in the marine riser conductor and the choke/kill lines of the drilling rig.
FIG. 2 is an enlarged side elevational view, partly in longitudinal section, of the portion of the subsea drilling rig of FIG. 1 which incorporates pressure balanced ball and socket joints of the present invention.

FIG. 1 diagrammatically illustrates a drilling apparatus R extending between a subsea well bore A and a drilling vessel D from which the well is drilled. A suitable base E rests on the sea floor B, and a plurality of concentric casing strings F, G extend downwardly into the well bore A. One of the strings of casing is connected through one or more connectors H, one or more blowout preventers J, and a ball and socket joint 10 to the lower portion of a marine riser conductor pipe M extending upwardly to the drilling vessel D. A pair of choke/kill lines C, C extend between the vessel D and the blowout preventers J, which are used to kill the well by pumping heavy mud down the well bore when the blowout preventer rams are closed around the drill pipe or when blind rams are closed, in a known manner. The choke line is also used to bleed off formation pressure through a controlled manifold on the drilling vessel D, in a known manner. Hydraulic fluid under pressure to actuate the several rams in the blowout preventer is usually conducted from the drilling vessel through a flexible hose (not shown). Each of the choke/kill lines C, C may include two pressure balanced ball and socket joints 100, 100 connected through a telescopic joint 102. The choke/kill lines are suitably supported from the marine conductor pipe M in a known manner.

Drilling of the well bore A is conducted in the conventional manner from the floating vessel D through the marine conductor pipe M, joint 10, connectors H, blowout preventers J, and casing G. If the vessel D moves off its location directly above the well bore A, the ball and socket joints 10 and 100 will minimize lateral strain or bend in the marine conductor pipe M and the choke/kill lines C, C, thereby preventing damage to the equipment.

Figure 3:
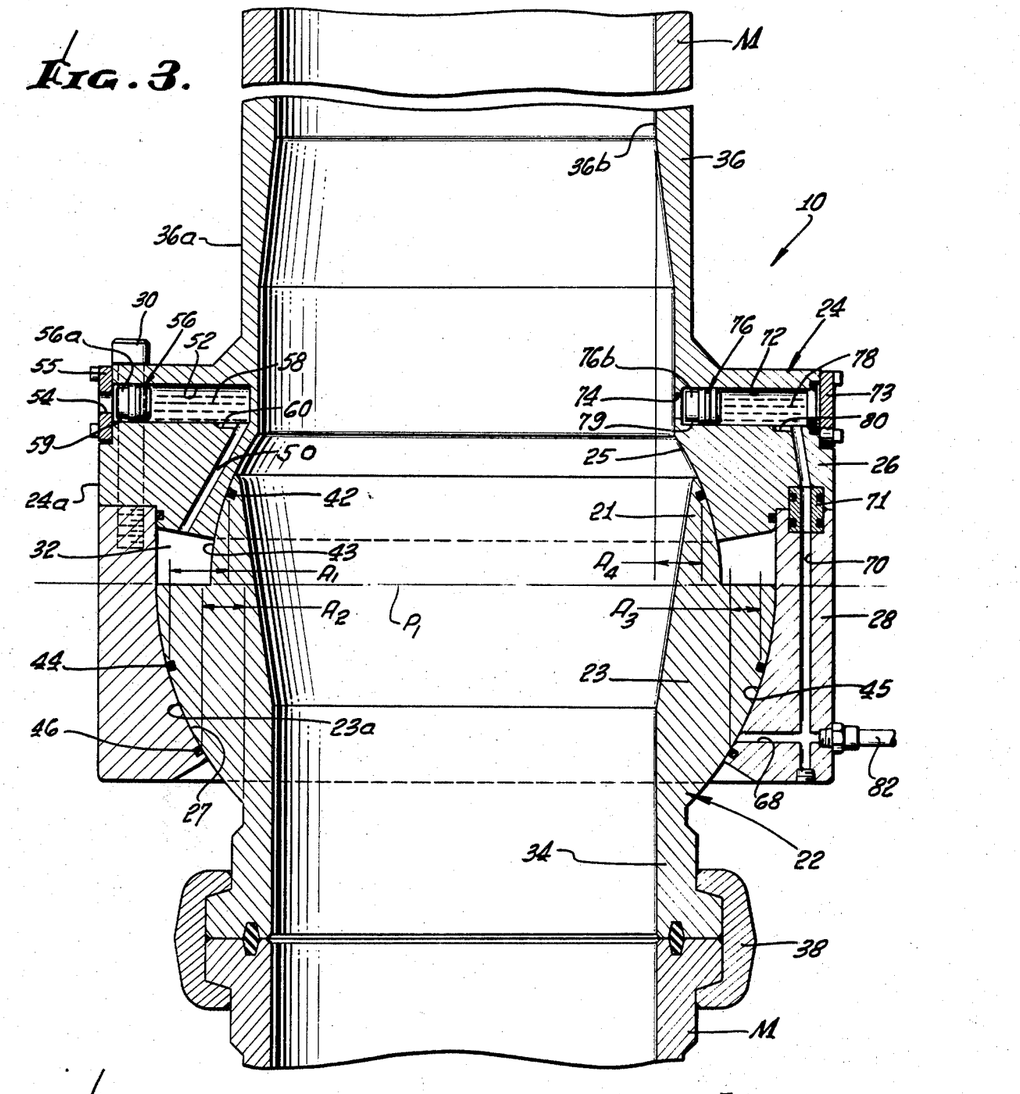
FIG. 3 is an enlarged longitudinal section taken along the lines 3—3 of FIG. 2, illustrating one embodiment of the pressure balanced ball and socket joint of the present invention, the joint being particularly adapted for use in a marine riser conductor, such as the riser incorporated in the drilling rig shown in FIGS. 1 and 2.

Referring to FIG. 3, the pressure balanced joint 10 in the marine conductor pipeline M comprises a ball or pin member 22 having a ball or spherical shape, and a socket or box member 24 having an internal spherical wall 25, 27 receiving the ball member. The socket member 24 is in two pieces, including an upper section 26 and a lower section 28 joined by a plurality of circumferentially spaced screws 30.

The ball 22 is a two radius ball, the upper portion 21 of the ball having a smaller radius than the lower portion 23 of the ball. Similarly, the upper socket wall 25 which receives the smaller, upper ball portion 21 has a smaller radius than the lower socket wall 27 which receives the larger, lower ball portion 23. The radii of the ball portions 21, 23 and the socket walls 25, 27 are such that the ball and socket form an annular space or chamber 32 between the upper section 26 of the socket member 24 and the lower portion 23 of the ball or pin member.

A pipe portion 34 is integral with and extends downwardly from the ball 22. The socket member 24 has an upwardly extending pipe portion 36 integral therewith. A suitable connector 38 couples the pipe portion 34 to the blowout preventer J or to a section of the marine riser pipe M below the joint 10. A suitable connector (not shown) may couple the pipe section 36 to a section of the marine riser pipe above the joint 10 or the pipe portion may constitute a section of the marine riser itself.

An O-ring seal 42 is provided in an annular groove in the upper ball portion 21, slidably sealing against the upper socket wall 25. O-ring seals 44 and 46 are carried by the lower ball portion 23 and lower socket portion 24, respectively, slidably sealing against opposite spherical surfaces 27, 23a of the socket and ball, respectively.

The pressure of the sea water outside the joint 10 is transferred to the space 43 between the seals 42, 44 by a pressure transfer piston 56 disposed in a chamber 52 in the upper socket section 26. The rear end of the chamber 52 is open to the sea water pressure through a port 54 in a cover plate 55 suitably detachably secured to the upper socket section 26; and the forward end of the chamber 52 communicates with the upper space 43 (between O-rings 42 and 44) via a channel 50 in the upper socket section 26 extending between the inner end of the chamber or cylinder 52 and the annular space 32.

A suitable hydraulic fluid 58 fills the piston chamber 52, channel 50 and the annular space 32. The hydraulic fluid 58 serves two functions. It transfers the pressure of the sea water to the upper space 43 between the ball and socket through the piston 56, and it also serves as a constant source or reservoir of lubrication for the mating spherical surfaces to minimize wear thereon. The pressure transfer piston 56 and the hydraulic fluid 58 may be eliminated, if desired, since the sea water itself would accomplish these functions (i.e., pressure transfer and lubrication). However, since the sea water would eventually contaminate and cause erosion of the mating ball and socket surfaces, it is desirable to use the pressure transfer piston 56 and the oil or other hydraulic fluid 58 to isolate the mating ball and socket surfaces from the sea water.

The O-rings 42 and 44 are positioned so that the hydraulic fluid 58 in the space 43 between the O-rings 42 and 44 acts upwardly on the socket member 24 with a force substantially equal to the downward force on the socket member created by the sea water outside the joint 10. Recognizing that the downward force on the socket member created by the sea water outside the joint is equal to the pressure of the sea water multiplied by the "resultant area" of the socket member against which the sea water acts downwardly, and recognizing that the pressure of the hydraulic fluid 58 (transferred via piston 56) is equal to the external sea water pressure, substantial balance of the external sea water forces on the socket member may be obtained by positioning the O-rings 42 and 44 so that the effective area of the socket walls 25, 27 against which the pressure of the fluid 58 acts upwardly is substantially equal to the "resultant area" of the socket against which the external sea water acts downwardly.

The effective area of the socket walls 25, 27 against which the hydraulic fluid 58 acts upwardly is the annular area $A_1$ defined by projecting the O-rings 42 and 44 onto a horizontal reference plane $P_1$ (FIG. 3). Since this annular area $A_1$ is the area against which the hydraulic fluid 58 acts to balance the sea water pressure acting on the outside of the joint, this area $A_1$ may be defined as the "water balance area." It is this "water balance area" $A_1$ which should be approximately equal to the "resultant area" against which the sea water outside the joint acts on the socket member 24.

The "resultant area" against which the sea water pressure acts on the socket member 24 outside the joint 10 is calculated by summing the areas on which the sea water acts in upward and downward directions. The sea water acts downwardly on the annular area defined by projecting the smallest outer periphery 36a of the marine riser pipeline M (it being understood that the pipe sections 34 and 36 form part of the marine riser pipeline) and the outer periphery 24a of the socket member 24 onto a horizontal reference plane (e.g., reference plane $P_1$). The sea water pressure also acts upwardly on the annular area defined by projecting the outer periphery 24a of the socket member 24 and the O-ring 46 onto a horizontal reference plane. Thus, the resultant sea water pressure (externally of the joint 10) acts downwardly on the socket member 24 against a "resultant area" $A_2$ defined by projecting the O-ring 46 and the smallest outer periphery 36a of the riser pipe onto the horizontal reference plane $P_1$.

Accordingly, the O-rings 42 and 44 should be positioned so that the "water balance area" $A_1$, defined by projecting the O-rings 42 and 44 onto the horizontal reference plane $P_1$, is equal to the "resultant area" $A_2$. It is against this "water balance area" $A_1$ that the sea water pressure within the socket 24 (transferred via piston 56 and hydraulic fluid 58) acts in an upward direction to balance the resultant downward pressure of the external sea water acting over the area $A_2$.

It will be noted that the "water balance area" $A_1$ may also be calculated with reference to the ball or pin member 22. The external sea water acts upwardly on the ball 22 against the annular area $A_2$ defined by projecting the O-ring 46 and the smallest outside perimeter 36a of the riser pipe M onto the horizontal reference plane $P_1$. This "water balance area" $A_1$ defined by projecting the O-rings 42 and 44 onto the horizontal reference plane $P_1$ should be equal to the area $A_2$. The sea water pressure within the socket 24 (transferred via piston 56 and hydraulic fluid 58) acts downwardly on the ball member 20 against the "water balance area" $A_2$ to balance the upward force of the sea water external of the joint 10.

If it is desired to provide an imbalance acting up on the socket member 24 (and downwardly on the ball member 22), to add to the tension normally imposed on the riser pipeline M, the O-rings 42 and 44 may be positioned so that the "water balance area" $A_1$ is somewhat greater than the "resultant area" $A_2$ against which the sea water pressure outside the joint acts. For example, recognizing that the sea water pressure does not act on the annular area between the inside and outside perimeters of the riser pipe M (since the upper end of the riser pipe extends above the water surface; FIG. 1), the "water balance area" $A_1$ may be made equal to the annular area defined by projecting the O-ring 46 and the inside periphery 36b of the riser pipe M onto the horizontal reference plane $P_1$ (rather than the "resultant area" $A_2$ defined by projecting the O-ring 46 and the outside periphery 36a onto the plane $P_1$). As a result, there will be an imbalance acting upon the socket 24 (and down on the ball 22) in the same direction as the tension normally imposed on the riser pipe string.

Figure 3A:
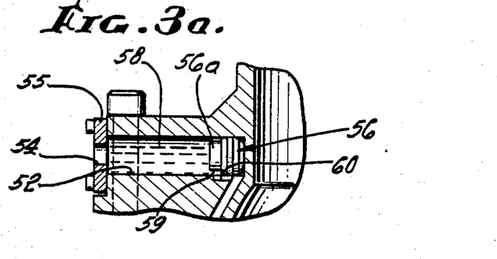
FIG. 3a is a fragmentary section of a portion of the joint of FIG. 3, illustrating a safety feature which insures that the pressure balanced system will remain operative even if hydraulic leakage occurs therein.

The water balance system in the joint 10 incorporates means to insure that the system will remain operative if leakage of the hydraulic fluid 58 occurs in the system. As best shown in FIG. 3a, the rear portion 56a of the pressure transfer piston 56 is of a reduced diameter to provide an annular by-pass 59 between the exterior piston surface and the internal wall of chamber 52, the forward end of the piston chamber 52 being provided with an arcuate cut 60. If leakage of the hydraulic fluid 58 occurs within the system, the external sea water pressure will cause the pressure transfer piston 56 to "bottom out" (i.e., move to the right side of the chamber 52). However, the sea water itself will flow to the space 43 between O-rings 42 and 44 via the annular by-pass 59 and the arcuate cut 60 at the forward end of the chamber 52, thereby continuing to balance the sea water pressure on the joint, and also continuing to lubricate the bearing surfaces of the ball and socket walls.

The hydrostatic pressure of the drilling mud in the marine riser pipe M (including joint 10) also creates forces on the ball and socket members 22 and 24 which are to be balanced.

To balance these forces, the pressure of the drilling mud in the marine riser pipe is transferred to the lower space 45 (between O-rings 44 and 46) by a pressure transfer piston 76 disposed in a chamber or cylinder 72 in the upper socket section 26. The rear end of the chamber 72 is open to the drilling mud pressure through a port 74 in the interior wall of the upper socket section 26; and the forward end of the chamber 72 communicates with the annular space 45 between O-rings 42 and 44 via channels 68 and 70 in the socket member 24. A cover plate 73 is suitably detachably secured to the upper socket section 26 over the outer end of the chamber 72, providing access to the chamber.

A suitable hydraulic fluid 78 fills the chamber 72 and the channels 68 and 70. The hydraulic fluid 78 transfers the pressure of the drilling mud within the riser pipe M to the fluid in the space 45 between the ball and the socket wall, via the piston 76, and it also serves as a constant source of lubrication to minimize wear on the exterior ball surface and the interior socket wall surface. Although the drilling mud itself would accomplish these functions (i.e., pressure transfer and lubrication), it would eventually contaminate and cause erosion of the mating ball and socket surfaces. Accordingly, it is desirable to use the pressure transfer piston 76 and the hydraulic fluid 78 to isolate the mating ball and socket surfaces from the drilling mud.

A suitable fitting 71 is provided between the upper and lower socket sections 26 and 28 to prevent leakage of the hydraulic fluid 78 between these sections.

The O-rings 44 and 46 are positioned so that the hydraulic fluid 78 in the space 45 therebetween acts downwardly on the socket member 24 with a force substantially equal to the upward force on the socket member created by the drilling mud in the marine riser M and joint 10. Recognizing that the upward force on the socket member created by the drilling mud in the joint is equal to the pressure of the drilling mud multiplied by the "resultant area" of the socket member against which the drilling mud acts upwardly and recognizing that the pressure of the hydraulic fluid 78 (transferred via piston 76) is equal to the drilling mud pressure, substantial balance of the pressure of the drilling mud within the riser pipe and joint 10 may be obtained by positioning the O-rings 44 and 46 so that the effective area of the socket wall 27 against which the pressure of the fluid 78 acts downwardly is substantially equal to the area of the socket and pipe 36 against which the drilling mud acts upwardly.

The effective area of the socket wall 27 against which the hydraulic fluid 78 acts downwardly is the annular area $A_3$ defined by projecting the O-rings 44 and 46 onto the horizontal reference plane $P_1$. Since this annular area $A_3$ is the area against which the hydraulic fluid 78 acts to balance the drilling mud pressure within the joint, this area $A_3$ may be defined as the "mud balance area". It is this "mud balance area" $A_3$ which should be approximately equal to the area against which the drilling mud pressure within the joint acts on the socket member 24 and pipe 36.

The effective area against which the drilling mud pressure acts upwardly on the socket member 24 and pipe 36 is the annular area $A_4$ defined by projecting the O-ring 42 and the smallest internal periphery 36b of the riser pipe onto the horizontal reference plane $P_1$.

Accordingly, the O-rings 44 and 46 should be positioned so that the "mud balance area" $A_3$ defined by projecting the O-rings 44 and 46 onto the horizontal reference plane $P_1$ is equal to the effective annular area $A_4$ against which the drilling mud in the joint acts upwardly. It is against this "mud balance area" $A_3$ that the drilling mud pressure (transferred via piston 76 and hydraulic fluid 78) acts in a downward direction to balance the resultant upward pressure of the drilling mud in the joint.

It will be noted that the "mud balance area" $A_3$ may also be calculated with reference to the ball or pin member 23. The pressure of the drilling mud in the joint 10 acts downwardly on the ball 22 over the annular area $A_4$ defined by projecting the O-ring 42 and the smallest internal periphery 36b of the riser pipe M onto the horizontal reference plane $P_1$. The projected annular "mud balance area" $A_3$ is equal to the annular area $A_4$, and the drilling mud pressure transferred via piston 76 and hydraulic fluid 78 acts upwardly on the ball member 22 against this "mud balance area" $A_3$ to balance the downward force of the drilling mud within the joint 10 and pipe.

The mud balance system in the joint 10, like the water balance system, incorporates means to insure that the system will remain operative if leakage of the hydraulic fluid 78 occurs in the system. The rear portion 76b of the pressure transfer piston 76 is of a reduced diameter to provide an annular by-pass 79 between the exterior piston surface and the internal wall of chamber 72, and the forward end of the piston chamber 72 is provided with an arcuate cut 80. If leakage of the hydraulic fluid 78 occurs within the system, the drilling mud pressure will cause the pressure transfer piston 76 to "bottom out" (i.e., move to the outer side of the chamber 72). However, the drilling mud itself will flow to the space 45 between O-rings 44 and 46, via the annular by-pass 79 and the arcuate cut 80 at the forward end of the chamber 72, thereby continuing to balance the drilling mud pressure within the joint, and also continuing to lubricate the mating surfaces of the ball and socket walls.

If desired, a separate pressure line 82 may be connected to the socket member 26, in fluid communication with the channel 68, to permit selective application of added pressure to the lower space 45 between the ball and socket members to compensate for the riser tension imposed on the riser pipe line M. The pressure line 82 extends to a suitable source of pressurized fluid (not shown), preferably located on the drilling vessel D (FIG. 1).

From the foregoing, it is apparent that tensile forces on the ball and socket members 22 and 24 may be minimized or substantially eliminated by virtue of the hydraulic balance systems. As a result, binding and wearing of the mating ball and socket surfaces are substantially decreased, and the life of the joint is prolonged, especially when the joint is employed at substantial water depths (e.g., 5,000 feet or more).

The two-radius design of the ball 22 (i.e., the smaller upper ball section 21 and the larger lower ball section 23) permits the joint 10 to be made significantly shorter (e.g., 6 inches shorter) while retaining the same operating characteristics. The resultant savings in space is often critical, thereby rendering the two-radius design highly desirable. However, it is recognized that manufacturing costs in making a two-radius ball are somewhat greater than a single-radius ball. Accordingly, there may be instances where a single-radius ball may be desired. Accordingly, it is, of course, contemplated that the joint 10 may be manufactured with a single radius ball and companion socket.

Figure 4:
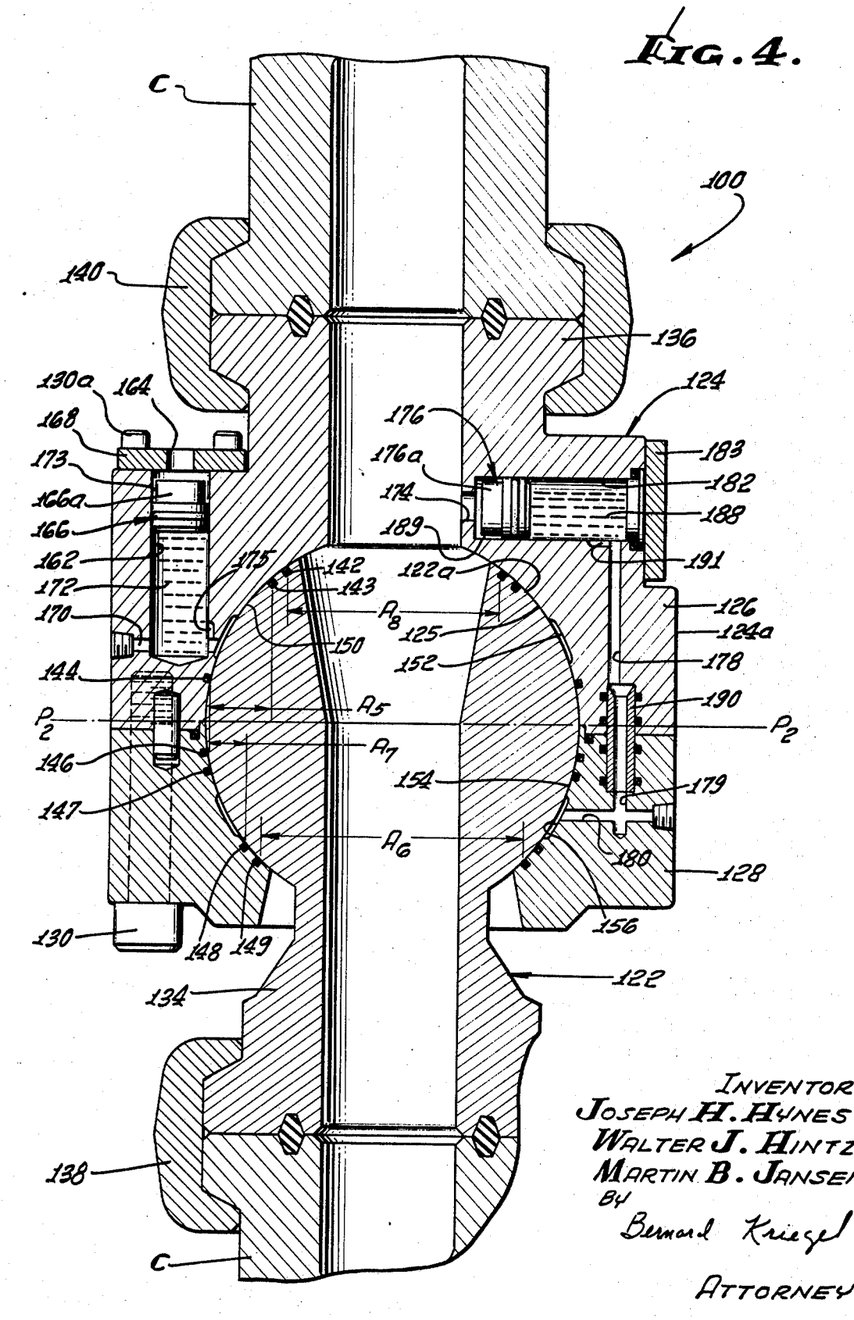
FIG. 4 is an enlarged longitudinal section taken along the lines 4—4 of FIG. 2, illustrating a second embodiment of a pressure balanced ball and socket joint of the present invention, the joint being particularly adapted for use in a choke/kill line incorporated in the drilling rig shown in FIGS. 1 and 2.

The pressure balanced ball and socket joint 100 illustrated in FIG. 4 is particularly designed for use in a choke/kill line C running between a blowout preventer stack J and the drilling vessel D in a subsea drilling apparatus. While the joint 100 incorporates many of the design principles of the marine riser joint 10 (FIG. 3), it differs in several details.

Referring to FIG. 4, the pressure balanced joint 100 comprises a ball or pin member 122 having an external spherical surface 122a and a socket or box member 124 having an internal spherical wall 125 which receives the ball. The socket member 124 is of two pieces, including an upper section 126 and a lower section 128 joined by a plurality of circumferentially spaced screws 130.

The ball member 122 has a downwardly extending pipe section 134 integrally connected thereto, the upper socket section 126 having an upwardly extending pipe section 136 integrally connected thereto. A suitable connector 138 couples the pipe section 134 to a section of the choke/kill line C below the joint 100, and a suitable connector 140 couples the pipe section 136 to a section of the choke/kill line above the joint 100.

One or a pair of O-ring seals, 142, 143 are provided in annular grooves in the upper end of ball member 122 sealingly engaging the socket wall 125. An O-ring seal 144 is provided in an annular groove in the upper socket section 126, sealingly engaging the ball surface 122a. One or more O-ring seals 146, 147 are also carried by the lower socket section 128, sealingly engaging the ball surface 122a; and one or more other O-ring seals 148, 149 are disposed in annular grooves in the lower socket section 128 in sealing engagement with the ball surface 122a.

The circumferentially spaced O-rings 142, 143, 144, 146, 147 148 and 149 divide the coengaging spherical surfaces of the ball 122 and the socket 124 into a series of arcuate annular regions. The region or thin annular space 150 between O-rings 143 and 144 is enlarged by an annular groove 152 in the upper portion of the socket wall 125, and the region or thin annular space 154 between O-rings 147 and 148 is enlarged by an annular groove 156 in the lower portion of the socket wall 125.

The pressure of the sea water outside the joint 100 is transferred to the upper space 150 between O-rings 143 and 144 by a pressure transfer piston 166 disposed in a cylinder or chamber 162 in the upper socket section 126. The outer end of the chamber 162 is open to the sea water through a port 164 in a cover plate 168 suitably detachably secured to the upper socket section 126, as by screws 130a; the inner end of the chamber 162 communicating with the annular space 150 (between O-rings 143 and 144) via a port or channel 170 in the upper socket section 126.

A suitable hydraulic fluid 172 fills the piston chamber 162 and the channel 170. The hydraulic fluid 172 serves two functions. It transfers the pressure of the sea water to the upper space 150 between the ball and the socket wall through the piston 166 and oil 172, and it also serves as a constant source of lubrication to minimize wear on the mating surfaces of the ball and socket members (i.e., the exterior ball surface and the interior socket wall surface). Of course, it is contemplated that the pressure transfer piston 166 and the hydraulic fluid 172 may be eliminated since the sea water itself would accomplish these functions (i.e., pressure transfer and lubrication). However, since the sea water would eventually contaminate and cause erosion of the mating ball and socket surfaces, it is desirable to use the pressure transfer piston 166 and the hydraulic fluid 172 to isolate the mating ball and socket surfaces from the sea water itself.

The O-rings 143 and 144 are positioned so that the hydraulic fluid 172 in the upper space 150 therebetween acts upwardly on the socket member 124 with a force substantially equal to the downward force on the socket member created by the sea water outside the joint 100. Recognizing that the downward force on the socket member created by the sea water outside the joint is equal to the pressure of the sea water multiplied by the "resultant area" of the socket member against which the sea water acts downwardly, and recognizing that the pressure of the hydraulic fluid 172 (transferred via piston 166) is equal to the sea water pressure, substantial balance of the external sea water forces may be obtained by positioning the O-rings 143 and 144 so that the effective area of the socket wall 125 against which the pressure of the fluid 172 acts upwardly is substantially equal to the "resultant area" of the socket and pipe 136, C against which the sea water acts downwardly.

The effective area of the socket wall 125 against which the hydraulic fluid 172 acts upwardly is the annular area $A_5$ defined by projecting the O-rings 143 and 144 onto a horizontal reference plane $P_2$ (FIG. 4). Since this annular area $A_5$ is the area gainst which the hydraulic fluid 172 acts to balance the sea water pressure acting on the outside of the joint, this area $A_5$ may be defined as the "water balance area." It is this "water balance area" which should be approximately equal to the "resultant area" against which the sea water outside the joint acts on the socket member 124 and pipe 136, C.

The "resultant area" against which the sea water pressure acts on the socket member 124 outside the joint 100 is calculated by algebraically summing the areas on which the sea water acts in upward and downward directions. The sea water pressure acts downwardly against an effective area equal to the entire cross-sectional area enclosed by the largest outside perimeter 124a of the socket member 124; and the sea water pressure acts upwardly on the annular area between the largest outside perimeter 124a of the socket member 124 and the O-ring 149. Thus, the resultant sea water pressure (externally of the jpont 100) acts downwardly on the joint member 124 against a "resultant area" $A_6$ equal to the area enclosed by the O-ring 149.

Accordingly, the O-rings 143 and 144 should be positioned so that the "water balance area" $A_5$ defined by projecting the O-rings 143 and 144 onto the horizontal reference plane $P_2$ is equal to the "resultant area" $A_6$. It is against an area equal to this "water balance area" $A_5$ that the internal sea water pressure (transferred via piston 166 and hydraulic fluid 172) acts in an upward direction to balance the resultant downward pressure of the external sea water.

It will be noted that the proper "water balance area" $A_5$ may also be calculated with reference to the ball or pin member 120. The external sea water acts upwardly on the ball 120 against the area $A_6$ enclosed by the O-ring 149. Thus, the "water balance area" $A_5$ defined by projecting the O-rings 143 and 144 onto the horizontal reference plane $P_2$ should be equal to the area $A_6$. The internal sea water pressure (transferred via piston 166 and hydraulic fluid 172) acts downwardly on the ball member 120 against the "water balance area" $A_5$ to balance the upward force of the sea water external of the joint 100.

The water balance system in the joint 100 incorporates means to insure that the system will remain operative if leakage of the hydraulic fluid 172 occurs in the system. The upper or outer portion 166a of the pressure transfer piston 166 is of a reduced diameter to provide an annular by-pass 173 between the exterior piston surface and the internal wall of piston chamber 162, and the inner end of the chamber 162 is provided with an arcuate slot 175. If leakage of the hydraulic fluid 172 occurs within the system, the sea water pressure will cause the pressure transfer piston 166 to "bottom out" (i.e., move to the bottom of the chamber 162). However, the sea water itself will flow through the annular by-pass 173 and the arcuate cut 175 at the inner end of the chamber 162, continuing to balance the sea water pressure on the joint, and also continuing to lubricate the bearing surfaces of the ball and socket walls.

The hydrostatic pressure of the liquid in the choke/kill line C (including joint 100) also creates forces or stresses on the ball and socket members 122 and 124.

To balance these forces, the pressure of the liquid or other fluid in the choke/kill line is transferred to the region 154 between O-rings 147 and 148 by a pressure transfer piston 176 disposed in a cylinder or chamber 182 in the upper socket section 126. The inner end of the chamber 182 is open to the internal liquid pressure through a port 174 in the interior wall of the upper socket section 126; and the outer end of the chamber 182 communicates with the region or thin annular space 154 between O-rings 147 and 148 via channels 178, 179 and 180 in the socket member 124. A cover plate 183 detachably secured to the upper socket section 126 over the outer end of piston chamber 182 provides access to the chamber.

A suitable hydraulic fluid 188 fills the piston chamber 182 and the channels 178, 179, and 180. The hydraulic fluid 188 transfers the pressure of the liquid in the choke/kill line to the region 154 between the seal rings 147, 148 via the piston 176, and it also serves as a constant source of lubrication to minimize wear on the mating ball and socket surfaces (i.e., the exterior ball surface and the interior socket wall surface). Although the liquid itself could accomplish these functions (i.e., pressure transfer and lubrication), it would eventually contaminate and cause erosion of the mating ball and socket surfaces. Accordingly, it is desirable to use the pressure transfer piston 176 and the oil or other hydraulic fluid 188 to isolate the mating ball and socket surfaces from the internal liquid.

A suitable fitting 190 is provided between the upper and lower socket sections 126 and 128 for preventing leakage of the hydraulic fluid 188 therebetween.

The O-rings 147 and 148 are positioned so that the hydraulic fluid 188 in the space 154 therebetween acts downwardly on the socket member 124 with a force substantially equal to the upward force on the socket member created by the liquid within the joint 100 and pipe portions 134, 136. Recognizing that the upward force on the socket member created by the internal liquid is equal to the pressure of the internal liquid multiplied by the "resultant area" of the socket member against which the liquid acts upwardly, and recognizing that the pressure of the hydraulic fluid 188 (transferred via piston 176) is equal to the liquid pressure, substantial balance of the pressure of the liquid mud within the choke/kill line may be obtained by positioning the O-rings 147 and 148 so that the effective area of the socket wall 125 against which the pressure of the fluid 188 acts downwardly is substantially equal to the area of the socket and pipe against which the internal liquid acts upwardly.

The effective area of the socket wall 125 against which the hydraulic fluid 188 acts downwardly is the annular area $A_7$ defined by projecting the O-rings 147 and 148 onto the horizontal reference plane $P_2$. Since this annular area $A_7$ is the area against which the hydraulic fluid 188 acts to balance the liquid pressure acting within the joint and pipe, this area $A_7$ may be defined as the "liquid balance area." It is this "liquid balance area" $A_7$ which should be approximately equal to the area against which the liquid pressure within the joint and pipe acts on the socket member 124 and pipe 136.

Since the choke/kill line C is, effectively, a closed line, the effective area against which the inner liquid pressure acts upwardly on the socket member 124 and pipe 136 is the entie cross-sectional area enclosed by the O-ring 142.

Accordingly, the O-rings 147 and 148 should be positioned so that the "liquid balance area" $A_7$ (defined by projecting the O-rings 147 and 148 onto the horizontal reference plane $P_2$) is equal to the area $A_8$ enclosed by O-ring 142 against which the liquid in the joint and pipe acts upwardly. It is against this "liquid balance area" $A_7$ that the liquid pressure transferred via piston 176 and hydraulic fluid 188 acts in a downward direction to balance the upward pressure of the liquid in the joint and pipe.

It will be noted that the "liquid balance area" $A_7$ may also be calculated with reference to the ball or pin member 120. The pressure of the liquid in the joint 100 acts downwardly on the ball 122 against the area $A_8$ enclosed by the O-ring 142. The liquid pressure transferred via piston 176 and hydraulic fluid 188 acts upwardly on the ball member 122 against the "liquid balance area" $A_7$ (which is equal to the area $A_8$ enclosed by O-ring 142) to balance the downward force of the liquid on the ball.

The liquid balance system in the joint 100, like the water balance system, incorporates means to insure that the system will remain operative if leakage of the hydraulic fluid 188 occurs in the system. The rear portion 176a of the pressure transfer piston 176 is of a reduced diameter to provide an annular by-pass 189 between the exterior piston surface and the interior wall of chamber 182, and the outer end of the piston chamber 182 is provided with an arcuate cut 191. If leakage of the hydraulic fluid 188 occurs within the system, the liquid pressure will cause the pressure transfer piston 176 to "bottom out" (i.e., move to the outer side of the chamber 182). However, the liquid itself (in choke/kill line C) will flow through the annular by-pass 189 and the arcuate cut 191 at the outer end of the chamber 182, continuing to balance the liquid pressure within the joint, and also continuing to lubricate the bearing surfaces of the ball and socket walls.

From the foregoing, it is apparent that stresses or forces on the ball and socket members 122 and 124 may be minimized or substantially eliminated by the hydraulic balance systems. As a result, binding and wearing of the mating ball and socket surfaces are substantially decreased, and the life of the joint is prolonged, especially when the joint is employed at great depths (e.g., 5,000 feet or more).

Of course, numerous modifications and changes may be made to the embodiments disclosed and described above and in the drawings without departing from the spirit and scope of the invention. For example, while each of the two embodiments shown in the drawings and described above employ two pressure balance systems in a ball and socket type joint, the pressure balance concept of this invention may be effectively employed in other types of joints (e.g., non-universal), between two relatively movable members. Moreover, there may be instances where only one balance system (e.g., to balance tensile forces created by the fluid within a line) is necessary or desirable. Accordingly, it is intended that the invention be limited only by the scope of the appended claims.

We claim:

1. In a joint: a female member; a male member within said female member; said members being angularly movable relative to each other; fluid seal means between said members defining a first isolated region therebetween; and means establishing fluid pressure transfer from a source of fluid pressure to said region to exert a force in one direction on one of said members opposing a force in the opposite direction on said one member; wherein said fluid pressure transfer means comprises fluid passage means extending between said isolated region and the fluid externally of said joint; said fluid passage means including a chamber and a piston slidably disposed therein; said piston normally blocking fluid communication between said isolated region and the fluid externally of said joint; said chamber including a forward end in fluid communication with said isolated region and a rearward end in fluid communication with the fluid externally of said joint; and by-pass means establishing fluid communication between said isolated region and the fluid externally of said joint when said piston is at the forward end of said chamber.

2. In a joint: a female member; a male member within said female member; said members being angularly movable relative to each other; fluid seal means between said members defining a first isolated region therebetween; means establishing fluid pressure transfer from a source of fluid pressure to said region to exert a force in one direction on one of said members opposing a force in the opposite direction on said one member; said fluid pressure transfer means comprising fluid passage means extending between said isolated region and the source of fluid pressure; said fluid passage means including a chamber and a piston slidably disposed therein; said piston normally blocking fluid communication between said isolated region and the source of fluid pressure; said chamber including a forward end in fluid communication with said isolated region and a rearward end in fluid communication with the source of fluid pressure; and by-pass means establishing fluid communication between said isolated region and the source of fluid pressure when said piston is at the forward end of said chamber.

3. In a joint as defined in claim 2; wherein said fluid pressure means extends between said isolated region and a source of fluid pressure internally of said joint.

4. In a joint: a tubular box member having an internal spherical surface; a tubular pin member in said box member having an external spherical surface mating with said internal surface; said members being pivotally movable relative to each other; said tubular members having intercommunicating passages; first spaced fluid seal means between said internal and external surfaces defining a first isolated annular region therebetween extending between said spaced seal means; second spaced fluid seal means between said internal and external surfaces defining a second isolated annular region therebetween extending between said second spaced seal means; first means establishing fluid pressure transfer from a first source of fluid pressure to said first region to exert a force in one direction on one of said members opposing a force in the opposite direction on said one member; and second means establishing fluid pressure transfer from a second source of fluid pressure to said second region to exert a force in one direction on one of said members opposing a force in the opposite direction on said one member; said first fluid pressure transfer means including a first chamber in one of said members communicating with said first source, a first piston in said chamber subject to fluid pressure from said first source, and a liquid extending from said first piston to said first region; said second fluid pressure transfer means including a second chamber in one of said members communicating with said second source, a second piston in said chamber subject to fluid pressure from said second source, and a liquid extending from said second piston to said second region.

5. In a joint as defined in claim 4; said first source being external of said joint; said second source being in said intercommunicating passages.

6. In a joint as defined in claim 4; each piston being shiftable by fluid pressure to the end of its chamber, and by-pass means for each chamber establishing communication between its associated source and its associated isolated region when said piston is at said end of its chamber.

7. In a joint as defined in claim 6, said first source being external of said joint; said second source being in said intercommunicating passages.

* * * * *